United States Patent [19]

Herold et al.

[11] Patent Number: 4,919,603

[45] Date of Patent: Apr. 24, 1990

[54] DEVICE FOR REPAIRING WINDSHIELDS

[75] Inventors: Wolf-Dietrich Herold, Seefeld; Peter Koran, Weilheim, both of Fed. Rep. of Germany

[73] Assignee: ESPE Stiftung & Co. Produktions - und Vertriebs KG, Seefeld, Fed. Rep. of Germany

[21] Appl. No.: 346,733

[22] Filed: May 3, 1989

[30] Foreign Application Priority Data

May 11, 1988 [DE] Fed. Rep. of Germany ... 8806284[U]

[51] Int. Cl.⁵ ............................................. B32B 35/00
[52] U.S. Cl. ......................................... 425/12; 156/94; 156/286; 156/382; 264/36; 425/13
[58] Field of Search .................. 156/94, 286, 382; 264/36; 425/12, 13

[56] References Cited

U.S. PATENT DOCUMENTS

| | | | |
|---|---|---|---|
| 3,765,975 | 10/1973 | Hollingsworth | 156/94 |
| 4,385,015 | 5/1983 | Klettke | 264/36 |
| 4,419,305 | 12/1983 | Matles | 156/94 X |
| 4,569,808 | 2/1986 | Smali | 264/36 |
| 4,775,305 | 10/1988 | Alexander et al. | 425/12 |
| 4,814,185 | 3/1989 | Jones | 425/12 |

FOREIGN PATENT DOCUMENTS 3607738 7/1987 Fed. Rep. of Germany .

OTHER PUBLICATIONS

Instruction Booklet for CLEAR STAR, Clear Star Products, Inc. "Ultra Violet Curing System", 1984.
UV-25 "Windshield Repair Re-Supply", Clear Star Products, Inc. 1984.
"The Clear Star Way to Repair Stone Damaged Windshields", Clear Star Products, Inc., 1984.

Primary Examiner—Robert A. Dawson
Attorney, Agent, or Firm—Foley & Lardner, Schwartz, Jeffery, Schwaab, Mack, Blumenthal & Evans

[57] ABSTRACT

A device for repairing damages caused by stones on windshields comprises a syringe (10) the discharge opening (14) of which is inserted into an applicator (11) adhesively affixed to the windshield (29) by means of a sealing disk (12). The syringe (10) is pre-filled by the manufacturer with a predetermined amount of a liquid synthetic resin which is curable by light. By retracting the syringe plunger (17), a vacuum is created for removing air and moisture that may have penetrated into the damaged portion (30). In its rearmost position, the plunger (17) exposes a vent hold (23) formed in the wall of the syringe casing (13) so that the resin will then be urged into the damaged portion (30) by the ambient atmospheric pressure.

10 Claims, 1 Drawing Sheet

U.S. Patent     Apr. 24, 1990     4,919,603
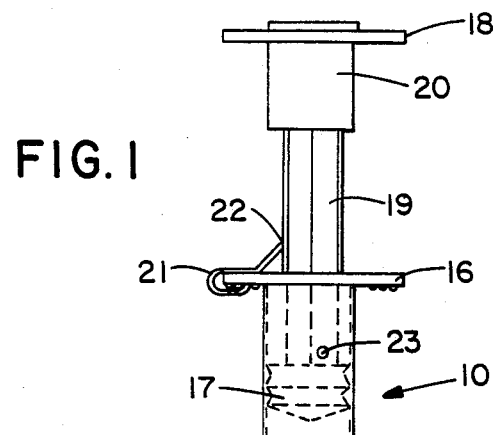
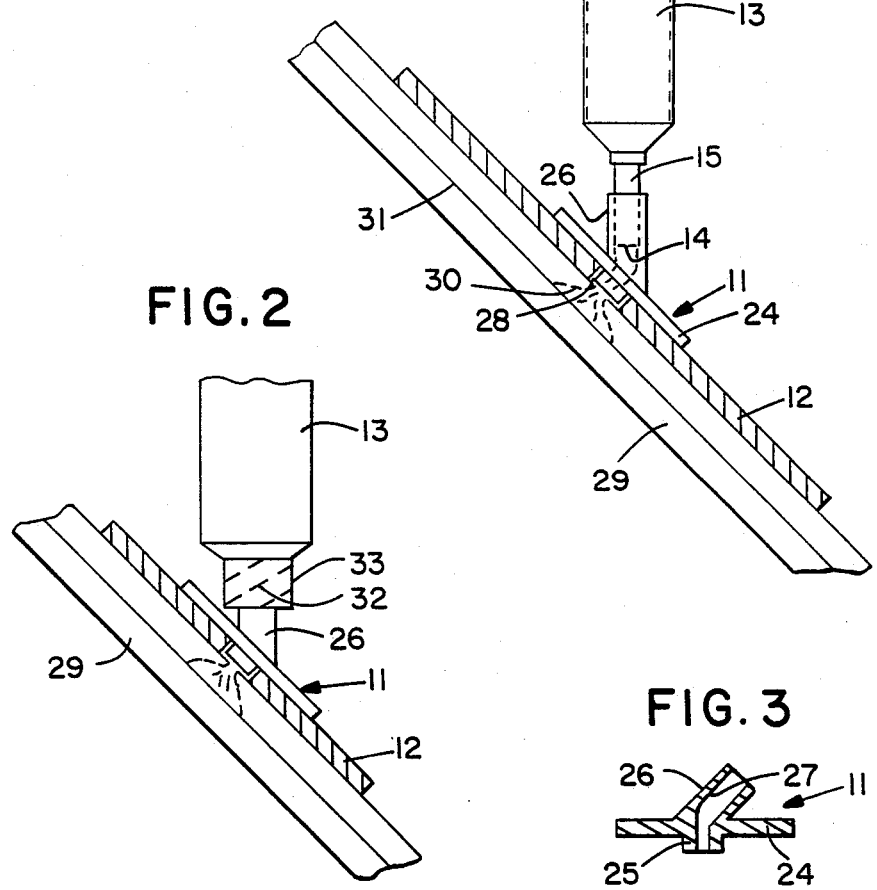

DEVICE FOR REPAIRING WINDSHIELDS

BACKGROUND OF THE INVENTION

Small craters of a few millimetres diameter can be caused by stones hitting safety-glass windshields of automotive vehicles. Normally a cone-like crack or pockmark is formed thereby which extends inwardly to the plastics sheet provided between the laminated sheets of glass.

It is known to repair such damages by injecting a liquid adhesive. An especially suitable adhesive is constituted by a synthetic resin which is cured by exposure to light and which, in its cured state, is clear and has a refractive index similar to that of the glass to be repaired. The adhesive has two functions, viz. firstly, to restore the mechanical stability of the glass and, secondly, to eliminate undesirable optical refraction phenomena by filling any air gaps between the faces of the crack.

U.S. Pat. No. 3,765,975 discloses a device for performing such repairs, in which a block is placed on the windshield with a cavity surrounding the damaged portion and sealed to the windshield surface. The liquid resin is filled into said cavity, whereafter vacuum and pressure are alternatingly produced by means of a syringe in order to evacuate the mentioned air gaps and to inject the resin into the same. The cavity formed within the block is sealed relative to the windshield by means of an O-ring. In order to keep the device in place it is necessary to apply pressure to the block and thus to the windshield in the vicinity of the pockmark, thereby incurring the risk of enlarging the damaged area due to such pressure and making a repair finally impossible. The same risk will be incurred when, due to repeated pumping operations by means of the syringe, excessive pressure is inadvertently built up in the vicinity of the pockmark. Also, there is the risk of adhesive being injected between the plastics and glass sheets. It is a further drawback that more synthetic resin is filled into the said cavity than is necessary for filling the cracks in the windshield so that, after the completed repair, the amount of injected resin may cause a permanent stress within the crack which may in turn lead to later damage.

DE-C-No. 3,607,738 discloses another device in which vacuum is produced by a flexible suction cup placed over the pockmark and liquid resin is supplied to the pockmark by means of a syringe. The suction cup, which is made from transparent material, is penetrated by the needle of the syringe. In order to enable the suction cup to produce the vacuum, it must initially be placed with a corresponding pressure onto the windshield in the vicinity of the pockmark. Again there is a risk that because of such manually caused pressure the already sensitive area in the vicinity of the pockmark is subjected to excessive stress and the crack is thereby enlarged. It is another difficulty that the suction cup, even though it may be made from transparent material, makes it difficult to view the damaged area and accurately to inject the resin in the area at the apex of the cone-like pockmark. Also, penetration of the suction cup by the syringe requires some skill to ensure that the needle tip will accurately meet said cone apex. If this cannot be achieved, the user will try to vary the direction of the needle by moving the syringe, which may result in leakages at the suction cup and a corresponding loss of vacuum. Finally, there is the risk that upon penetration of the suction cup the syringe may be moved too far inwardly and cause further damage to the already damaged portion.

Furthermore, a device sold by Clear Star Products, Inc., is available on the U.S. market, in which a sandwich-type annular adhesive tape with a hole leaving the pockmark exposed is placed on the windshield. A base is affixed to the adhesive tape, said base being provided with an outwardly extending tubular projection terminating at the hole in the adhesive tape. Liquid synthetic resin is filled into said projection by means of a pipette. A syringe is then introduced, which is provided in its sidewall near the bottom end with a vent opening adapted to be closed by a pin. When the pin is inserted, a plunger is initially retracted so as to produce a vacuum at the pockmark and to remove air entrapped therein. In the retracted position, the plunger is retained by the locking action of a spring clasp. The pin is then withdrawn to release the vacuum and is subsequently re-inserted. Then the plunger is depressed to inject the resin under pressure into the pockmark. In the pushed-in pressure position, the plunger is retained by a further locking means. The alternating vacuum/pressure pumping operation can be repeated several times.

A similar manipulation is provided in a further device known from U.S. Pat. No. 4,419,305 which comprises a syringe with a discharge opening and a vent hole penetrating a wall of the syringe casing near the front end thereof, a plunger movable within the casing, and a seal for hermetically sealing the discharge opening and the damaged portion relative to the ambient atmosphere. This device is first placed on the windshield without the plunger inserted and in such a manner that the seal surrounds the damaged portion, whereupon a synthetic resin in filled into the syringe casing. The plunger is then inserted to a position behind the vent hole. In this condition vacuum is applied via a hose to a chamber which surrounds the syringe to remove any air trapped in the resin. The plunger is then forwarded by manual rotation applied to a handle provided at the rear end thereof to urge the de-gassed resin into the pockmark.

In the use of the latter two devices, the resin will at once penetrate into the pockmark due to capillary forces. These capillary forces counteract the applied vacuum and render it difficult to de-gas the resin. There also is a risk of excessive pressure being exerted by the manual pumping operation which may widen the crack. Further, the applied pressure may not only move the plunger but inadvertently press also the whole syringe against the windshield, so that the pockmark is enlarged by this mechanical action. Finally, a predetermined sequence of handling steps must be observed in the practical application of these devices, and the various component parts of the respective overall device must be assembled and operated as prescribed so that, in addition to requiring manual skill, operating instructions must be closely followed for the repair to be successful.

SUMMARY OF THE INVENTION

It is an object of the present invention to provide a device for repairing damages caused by a stone on a windshield, which device ensures effective injection of the resin into the damaged portion or pockmark, which is easy to handle reliably and inexpensive to manufacture and in which mechanical stress on the pockmark is avoided.

In view of this object, the device of the present invention comprises a syringe composed of a cylindrical casing with a discharge opening and a vent hole penetrating a wall of the casing, and a plunger movable withing said casing from a forward to a rearward position, and sealing means for hermetically sealing said discharge opening and said damaged portion relative to the ambient atmosphere, wherein said vent hole is disposed near the rear end of said casing remote from said discharge opening so as to communicate with the interior space of the casing between said plunger and said discharge opening when said plunger is retracted to said rearward position.

The device designed in this way ensures that in operation there is first produced a vacuum of sufficient magnitude and that only thereafter the adhesive resin will reach the pockmark, will penetrate thereinto due to capillary forces during the evacuating stage and will only then be urged into the pockmark by the atmospheric pressure, while no pressure need be produced manually. Any excessive injection pressure is thereby avoided, and any additional damage to the pockmark due to manual pressure exerted on the device and thus inadvertently on the pockmark itself is prevented.

Further features of the present invention relate to the foolproof nature of the device by preventing any urging of the piston into the syringe casing. The invention also offers the advantage that the same syringe may be used for evacuating the crack and for injecting the synthetic resin, the syringe being filled at the manufacturer's and delivered to the user ready for use. Other advantageous measures reside in reducing the dead volume between the discharge opening of the syringe and the crack, preventing premature curing of synthetic resin which will polymerize under normal light, and obtaining a hermetic joint between the syringe and the pockmark.

BRIEF DESCRIPTION OF THE DRAWINGS

FIG. 1 is a side view showing a device in use for repairing a pockmark caused by a stone on a windshield that is shown partially in section, FIG. 2 shows a part of the device which is modified with respect to FIG. 1, and FIG. 3 is a sectional view showing a portion of the device illustrated in FIGS. 1 or 2.

DESCRIPTION OF PREFERRED EMBODIMENTS

As illustrated in FIG. 1, the entire device comprises three components, i.e. a syringe 10, an applicator 11 and a sealing disk 12.

The syringe 10 comprises a cylindrical casing 13 with a discharge nozzle 15 terminating in a discharge opening 14, and a flange 16 formed integrally with the rear end. A plunger 17 is movable within the casing 13 and is sealed relative to the inner wall thereof, the plunger 17 being connected to a piston rod 19 having a flange 18 at its rear end. In the vicinity of the rear flange 18, the piston rod 19 is provided with a sleeve 20 to prevent complete insertion of the piston rod 19 and thus of the plunger 17. As indicated in FIG. 1, the piston rod 19 has star-shaped cross-section. A detent 21 is fitted onto the flange 16 of the casing 13 and has a rearwardly facing knife edge 22 resting on the outer surface or one of the faces of the star-shaped piston rod 19, thereby inhibiting forward movement of the piston rod 19. In the rearward area (the upper region as seen in FIG. 1) of the casing wall, a hole 23 is formed at a location which, in the fully retracted position of the piston rod 19, is beneath the plunger 17 according to FIG. 1.

The applicator 11 comprises an annular and substantially rigid disk 24 of synthetic material with a diameter of preferably about 20 mm. One surface of the disk 24 has an integrally formed central connection piece 25 while the other surface is provided with a projection 26 integrally formed therewith at an angle of preferably about 45°. As will be especially clear from FIG. 3, the applicator 11 is formed with a passage 27 which extends through the projection 26 and the connection piece 25. The passage 27 is cylindrical along the major portion of the length of the projection 26 and tapers to a relatively small diameter towards its opening at the lower end of the connection piece 25. Preferably, the outer diameter of the connection piece 25 is about 6 mm. The inner diameter of the passage 27 in the vicinity of the projection 26 is designed so that the discharge nozzle 15 of the syringe 10 can be inserted thereinto with at least the outer end of the nozzle 15 sealingly engaging the inner wall of the passage 27 in the vicinity of the taper.

The sealing disk 12 is formed of a flexible plastic material provided with adhesive on both sides and has an outer diameter of preferably about 50 mm. The sealing disk 12 is formed with a central hole 28 having a diameter of preferably about 6 mm. The inner diameter of the hole 28 is slightly larger than the outer diameter of the connection piece 25 of the applicator 11 so that the connection piece 25 can be inserted into the hole 28. Preferably, the thickness of the sealing disk 12 is greater than 1 mm and is slightly greater than the length of the connection piece 25 of the applicator 11. This is to ensure that, upon insertion of the connection piece 25 into the hole 28, the lower end of the connection piece is retained at a small distance from the surface of the windshield indicated at 29 in FIG. 1.

In FIG. 1, a pockmark caused by a stone is indicated at 30 in the windshield 29, said pockmark having the characteristic conical crack structure which spreads from the outer glass surface towards the plastics sheet 31 provided between the two glass sheets.

To repair this pockmark, one of the foils (not shown) provided on either side of the sealing disk 12 for protecting the two adhesive layers thereon is removed. Then, the sealing disk 12 is affixed to the outer surface of the windshield 29 such that the centre of the pockmark 30 comes to lie in the region of the hole 28. Thereafter the second protecting foil is removed, and the applicator 11 is affixed with its disk 24 to the sealing disk 12 and with its connection piece 25 inserted into the hole 28 of the sealing disk 12 at such an orientation that the projection 26 extends substantially vertically upwards. For both affixing operations merely a slight pressure is required so that the pockmark 30 is not subjected to any extra load.

The syringe 10 is filled by the manufacturer with a predetermined amount of liquid, light-curing synthetic resin (not illustrated) in the space between the plunger 17 and the discharge opening 14. The piston rod 19 is pushed in until the sleeve 20 abuts the flange 16 of the casing 13. The discharge opening 14 has been closed, for instance, by a cap or plug.

The discharge opening 14 is now opened and the discharge nozzle 15 is inserted into the projection 26 of the applicator 11 in such a way that an air-tight seal is obtained between both parts. This seal is improved by the presence of the liquid resin.

By gripping the flanges 16 and 18, the plunger 17 is slowly retracted whereby a vacuum is created in the interior space of the casing 13 which communicates via the discharge nozzle 15 and the passage 27 in the applicator 11 with the cracks present in the damaged portion 30. Due to this vacuum, any air and moisture which may have penetrated into the damaged portion 30 will be removed. The escaping air passes through the resin that has already flown into the passage 27. During this stage of operation, any forward movement of the plunger 17, which would result in resin reaching the damaged portion before air and moisture have been sufficiently removed therefrom, is prevented by the knife edge 22 of the detent 21 engaging the piston rod 19. Advantageously, the knife edge 22 also results in a braking action on the withdrawing movement of the plunger 17, thereby ensuring that all air present in the pockmark is evacuated.

During further retraction of the piston rod 19, the plunger 17 moves to a position above the hole 23, so that air may now flow therethrough into the lower portion of the casing 13. The ambient air pressure now acts to transport the resin onto the pockmark 30, the penetration into the same being promoted both by said pressure and by the capillary forces that are effective in the fine cracks. The resin flow into the pockmark may be observed from the inner surface of the windshield.

After a waiting period of about ten minutes, the device is taken away by removing the sealing disk 12 from the windshield 29. A clear sheet may now be placed onto the damaged portion to provide an air-tight seal until the resin is completely polymerized by the action of incident daylight or artificial light.

The modification illustrated in FIG. 2 differs from the embodiment shown in FIG. 1 in that a sleeve 33 with an internal thread 32 is integrally formed at the lower end of the casing 13 of the syringe 10, the sleeve 33 surrounding the discharge nozzle 15 (not visible in FIG. 2). The thread 32 is used to screw the casing 13 down onto an external thread (likewise not shown) provided at the upper end of the projection 26 of the applicator 11. In this case the air-tight connection between casing 13 and applicator 11 is enhanced by the interengaging threads. The thread 32 is also used for fastening a cap (not illustrated) to close off the discharge opening 14 during shipment and storage.

The casing 13 of the syringe 10, the applicator 11 and the sealing disk 12 are made from opaque materials so as to prevent premature polymerization of the synthetic resin.

We claim:

1. A device for repairing a damaged portion caused by a stone on a windshield by means of a liquid clear-curing synthetic resin, comprising
   a syringe composed of a cylindrical casing with a discharge opening and a vent hole penetrating a wall of the casing, and a plunger movable withing said casing from a forward to a rearward position, and
   sealing means for hermetically sealing said discharge opening and said damaged portion relative to the ambient atmosphere,
   wherein said vent hole is disposed near the rear end of said casing remote from said discharge opening so as to communicate with the interior space of the casing between said plunger and said discharge opening when said plunger is retracted to said rearward position.

2. The device of claim 1, including means for inhibiting a movement of said plunger towards said forward position.

3. The device of claim 2, wherein said inhibiting means includes a knife edge facing in the direction of retraction of said plunger and engaging a piston rod connected to the rear end of said plunger.

4. The device of claim 2, wherein said inhibiting means is adapted to be fitted onto a flange formed at said rear end of said casing.

5. The device of claim 1, wherein said synthetic resin is filled into an interior space of said casing which exists between the initially closed discharge opening and said plunger in said forward position.

6. The device of claim 1, wherein said sealing means comprises an elastic sealing disk adapted to be affixed to said windshield and having a central hole of a size corresponding to said damaged portion, and a mounting disk adapted to be affixed to said sealing disk and having a connection piece for engagement with said central hole and an outwardly extending projection for receiving said discharge opening of said syringe casing.

7. The device of claim 6, wherein said sealing disk is made of an opaque material with a thickness of at least 1 mm and an outer diameter which is substantially larger than that of said damaged portion.

8. The device of claim 6, wherein said discharge opening of said syringe casing includes a threaded portion for connection with said projection of said mounting disk in an airtight manner.

9. The device of claim 8, wherein said threaded portion is formed in a sleeve which surrounds said discharge opening.

10. The device of claim 8, wherein said threaded portion is adapted to be used for receiving a closure cap.

* * * * *